US005771287A

United States Patent [19]
Gilley et al.

[11] Patent Number: 5,771,287
[45] Date of Patent: Jun. 23, 1998

[54] APPARATUS AND METHOD FOR SECURED CONTROL OF FEATURE SET OF A PROGRAMMABLE DEVICE

[75] Inventors: James E Gilley, Lincoln; Kenneth L. Snyder, Elmwood; Paul A. Schwartzkopf, Lincoln, all of Nebr.

[73] Assignee: Transcrypt International, Inc., Lincoln, Nebr.

[21] Appl. No.: 690,903

[22] Filed: Aug. 1, 1996

[51] Int. Cl.$^6$ .................................. H04L 9/00; H04L 9/32
[52] U.S. Cl. .................................... 380/4; 380/9; 380/23; 380/25; 380/49; 380/50; 380/59
[58] Field of Search .............................. 380/4, 9, 23, 25, 380/28, 30, 49, 50, 52, 59, 21

[56] References Cited

U.S. PATENT DOCUMENTS

| | | |
|---|---|---|
| 4,813,024 | 3/1989 | Lisimaque et al. . |
| 4,866,769 | 9/1989 | Karp . |
| 5,136,648 | 8/1992 | Olson et al. . |
| 5,247,577 | 9/1993 | Bailey et al. ............................. 380/23 |
| 5,416,840 | 5/1995 | Cane et al. . |
| 5,457,746 | 10/1995 | Dolphin . |
| 5,469,557 | 11/1995 | Salt et al. . |
| 5,490,216 | 2/1996 | Richardson, III . |
| 5,530,749 | 6/1996 | Easter et al. . |
| 5,530,753 | 6/1996 | Easter et al. . |

*Primary Examiner*—Bernarr E. Gregory
*Attorney, Agent, or Firm*—Zarley, McKee, Thomte, Voorhees & Sease

[57] ABSTRACT

An apparatus and method for controlling the feature set of a programmable device by assigning each programmable device a unique serial number, correlating a secret key with each serial number, and keeping that information in a secure location, such as at the manufacturer. Each optional feature set for the programmable devices is assigned a unique code, and software associated with the programmable device operates according to the feature set identified in the feature set code, if an authentication procedure is passed. The authentication procedure utilizes a secure cryptographic algorithm to calculate an authentication code based on the secret key and the authorized feature set for a programmable device. The authentication code is stored in the programmable device. Periodically, the programmable device automatically self checks itself by recalculating the authentication code. If it matches with the authorized authentication code, the authentication procedure is passed. If it does not match, the authentication procedure is not passed as it tends to indicate that there has been an attempt to tamper with the feature set code or to use an authorization code that is from another programmable device. If the authentication procedure is not passed, the programmable device may be disabled or some other limitation may be imposed on the device.

22 Claims, 5 Drawing Sheets

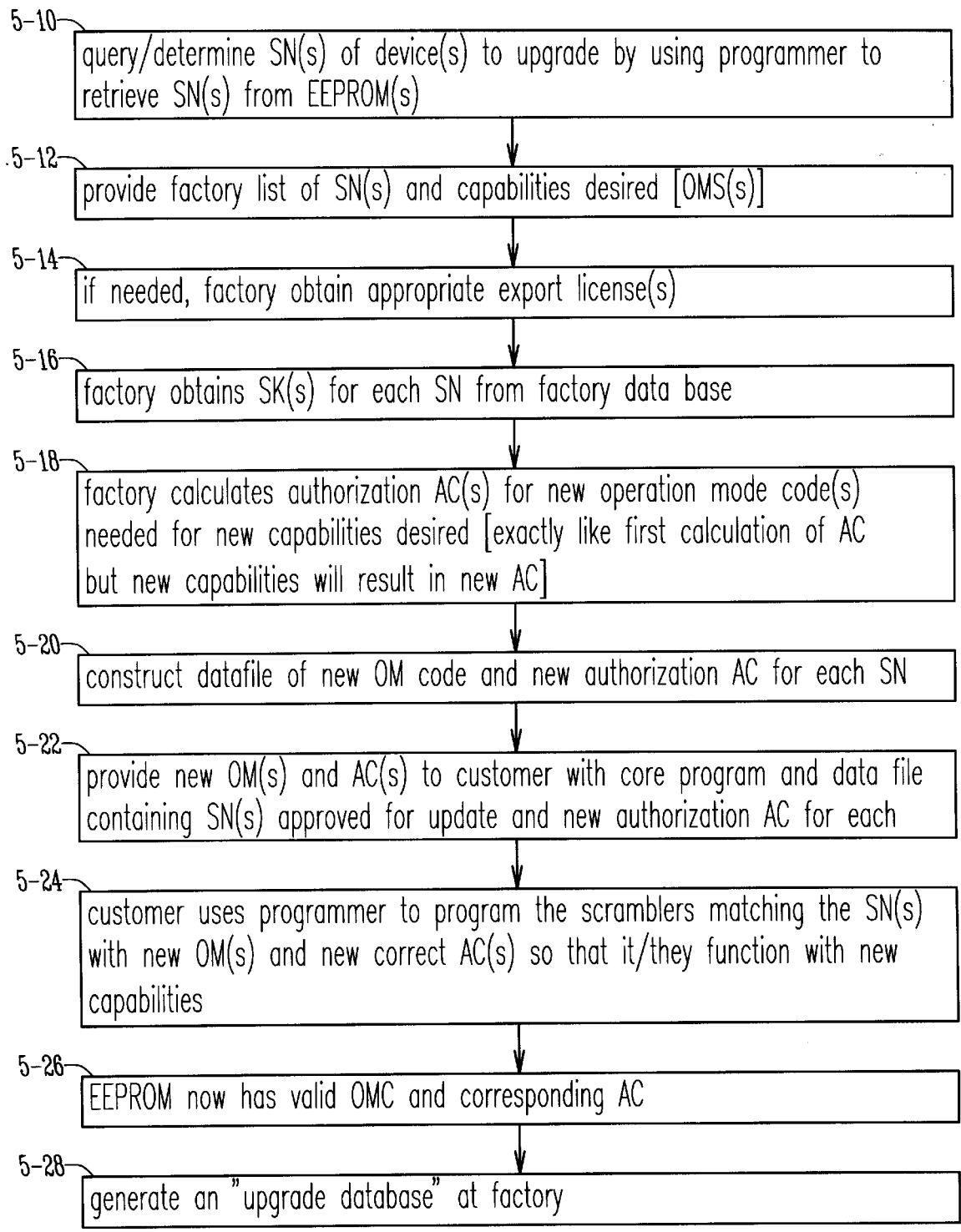

APPARATUS AND METHOD FOR SECURED CONTROL OF FEATURE SET OF A PROGRAMMABLE DEVICE

BACKGROUND OF THE INVENTION

A. Field of the Invention

This invention relates to programmable devices, and in particular, to ways to control the feature set of programmable devices, and further in particular, to ways to control the feature set of programmable devices in a manner that is substantially secure from tampering.

B. Problems in the Art

The onset of programmable devices allowed manufacturers the efficiencies and economies of building devices that inherently could perform many features. The number or extent of the features that actually would be operable in a given device could be controlled by how it was programmed. Thus, the same hardware had the capability of accomplishing a number of functions. The manufacturer could limit the functions by the nature of the software programmed into the hardware. Furthermore, manufacturers could offer updates or enhancements to existing features by simply reprogramming the device.

The nature of many modern programmable devices is such that the hardware capable of performing only some functions or features is the same or substantially the same cost to a manufacturer as hardware capable of performing all foreseeable functions. Therefore, to avoid having to maintain inventories of different hardware for different models or feature sets of the devices, manufacturers build them substantially identically in hardware content and structure. The manufacturing costs of varying the feature sets of various devices by different programming of the devices are less than building different models with different hardware; at least in many cases.

Moreover, the ability to enhance or upgrade an existing device, with an existing feature set, by simply reprogramming the device is highly flexible and economical. It is also most times easier and quicker than to exchange or add hardware to the device.

A specific example of the foregoing can be made with respect to voice scramblers used for securing radio communications between users having radio transceivers. Law enforcement or military personnel use such devices, but of course, others wanting secured communications also use them.

Such devices can have varying levels of security and various functions or features. For purposes of this description, the various capabilities or possible function or security levels will collectively be referred to as different feature sets. The manufacturer can therefore market models having varying feature sets and can price the models at different levels corresponding to the differences in the feature sets. The different feature sets may relate to (a) increasing levels of security, for example, increasing complexity of scrambling, (b) enhanced or more functions and options for the scrambler or the transceiver, or (c) other functions or features such as are known in the art.

Another relatively unique circumstance regarding many scrambling devices is that many governments, including the United States, have in place export restrictions on scrambling technology. For example, manufacturers may be prohibited from exporting scramblers having certain levels of security to other countries on the grounds of national security interests. In other instances, the government simply may want to know what technology is being exported and may require that licenses be obtained. This allows the government to know exactly what level of technology is going to what foreign countries.

In the former instance, the domestic manufacturer has to show the government that its devices do not function in a manner prohibited by the export restrictions, and that they can not be modified by the end user to do so. In the latter case, if an upgrading or changing of the devices is desired to occur in the future, the government must be notified and appropriate review and licensing must be undertaken by the manufacturer.

One way to meet the restrictions set forth above is to manufacture the devices with specific hardware that does not allow modification or upgrading to prohibited levels of scrambling. As alluded to before, this causes manufacturers to build physically different models, which presents the problems of maintaining inventories of the different models as well as the different hardware components for different models. It also presents difficulties to the customer which wants to upgrade a device. The customer is faced with either buying a new device, which in the case of scramblers is many times unacceptable because the scrambler is a part of a radio transceiver. It does not usually make economic sense to discard the entire transceiver, just to upgrade the scrambler therein.

Even if just the scrambler would be replaced presents problems. The transceiver many times must be sent to the scrambler manufacturer so that the scrambler can be physically removed and a new scrambler installed. This obviously can put the transceiver out of use for a substantial amount of time. It can also involve significant costs. For example, if an entire set of transceivers for a police force is to be upgraded, the replacement of scramblers would involve significant labor costs over and above the equipment costs.

Because it is efficient and economical to produce voice scramblers as programmable devices, some of the above discussed issues can be resolved, at least to some extent. By programming non-volatile, reprogrammable memory associated with the scrambler component with software that controls the feature set of the scrambler, the need to physically remove a scrambler with one feature set to replace it with another feature set is resolved. By using electrically erasable programmable read only memory (EEPROM) with the scrambler, to update the feature set, the manufacturer simply has to give new software to the customer. This is as simple as sending a computer floppy disk with the new software. Personal computer (PC) based programming systems, well known in the art, are used to reprogram the scrambler with the new feature set. These programming systems can even do the reprogramming on multiple scramblers, either in parallel or serially. The operation can be fairly automated and does not involve very much human labor.

Although the foregoing system has advantages for both manufacturer and customer, it also has significant deficiencies, particularly with respect to being able to control what feature set is enabled on each scrambler. It is highly vulnerable to tampering, since the EEPROM is easy to read, write, or replace. Since all the information needed to operate the scrambler is relatively easily available to those skilled in the art, if upgrade code can be obtained or developed, the end user could reprogram the scrambler to change its feature set without authorization of the manufacturer, or as discussed above, in violation of export restrictions of a government. Alternatively, if the end user is skilled, random programming might be used and may be successful in predicting the appropriate code needed to upgrade the scrambler. Therefore, even without obtaining the upgrade code, an end user may be able to create it and upgrade a number of scramblers, because of the overt availability of the existing feature set code in EEPROM, and the ability to evaluate it.

Moreover, an unscrupulous customer could purchase feature set upgrade software for one of its scramblers, and then use that software to reprogram its entire set of scramblers, without paying for the other scramblers. Because the upgrade information is the same for all scramblers, and because this information is contained in an EEPROM, fraudulent upgrading is relatively easy to perform.

Therefore, with regard to devices which are programmable, there is real and present need for a way to control the feature set of the device, either by restricting it or by changing or upgrading it, which overcomes the problems and deficiencies in the art.

It is therefore a principle object of the present invention to provide an apparatus and method of controlling the feature set of a programmable device which solves or improves over the problems and deficiencies in the art. Other objects of the invention include the provision of an apparatus and method which:

(a) avoids the cost and time of replacing hardware to change the feature set;

(b) does not require additional hardware;

(c) is highly resistant to tampering;

(d) allows control of a wide variety of functions or features of the device;

(e) limits inconvenience to customers when they desire a change in the feature set;

(f) improves ability of manufacturers to obtain compensation for updates to feature sets;

(g) allows manufacturers improved ability to meet export requirements and prevent end users from frustrating export requirements, or other regulations;

(h) is efficient and economical; and (i) is accurate and reliable.

These and other objects, features, and advantages of the present invention will become more apparent with reference to the accompanying specification and claims.

BRIEF DESCRIPTION OF THE DRAWINGS

FIG. 5 is a flow chart of operational steps to upgrade the feature set of a scrambler.

SUMMARY OF THE INVENTION

Figure 1:
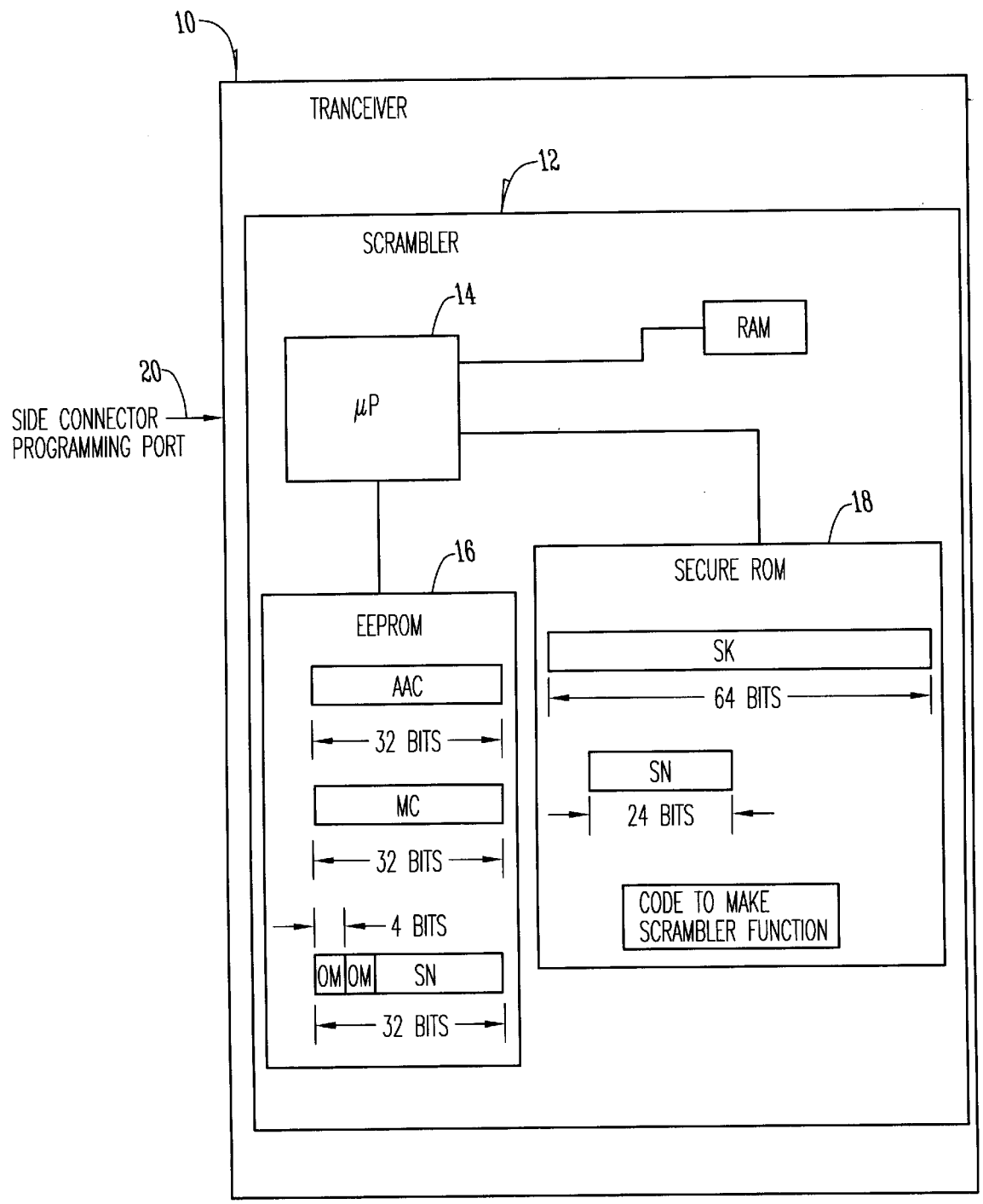
FIG. 1 is a schematic diagram of a radio transceiver, a programmable scrambler installed on the radio transceiver, and relevant components of the scrambler, according to a preferred embodiment of the invention. Certain information stored in various memories associated with the scrambler is also schematically depicted.

The present invention includes an apparatus and method to control the feature set of a programmable device. The method according to the invention assigns a unique serial number to each programmable device. A number called a secret key, for example a randomly generated number, is correlated to each serial number and stored in a secure location, for example, at the manufacturer's facility. The feature set desired for the device is selected and a code which instructs the device to enable that feature set, called an operation mode code, is created. The secret key and the operation mode code are programmed into the memory of the scrambler. The secret key is stored in a secure memory. The operation code does not have to be.

What is called an authentication code is calculated using the operation mode code and the secret key together with a cryptographic methodology. This authentication code is then also programmed into the programmable device's memory. It does not have to be secure.

To operate with the correct feature set, periodically the device is turned on, using the same cryptographic program as the manufacturer used, calculates its present authentication code value based on the secret key, which it can internally access, and the then present operation mode code stored in the programmable device. This present authentication code is then compared by the programmable device to the factory calculated and set authentication code that was originally stored in the programmable device memory. If the two authentication codes match, the programmable device will be authorized to function with the then present feature set defined by the then present operation mode code. If they do not match, the programmable device can take a number of different actions, including refusing to conduct certain functions, refusing to operate at all, or defaulting to a lower feature set. Other actions are possible.

The apparatus according to the invention utilizes a programming device that includes a database which correlates and stores a set of programmable device serial numbers to a set of secret keys. Each programmable device, uniquely identified by a serial number, has a secure memory location to store the secret key associated with its serial number. Both the programming device and each programmable device includes memory with a program that uses a secure cryptographic method to calculate authentication codes. The authentication codes are resolved by using the cryptographic algorithm in association with an operation mode code that enables the programmable device to operate the authorized feature set and the secret key. The programming device stores an original authentication code in memory of the scramble. It does not have to be secure because it is based upon the secure cryptographic algorithm and the secret key. To operate the authorized feature set, the programmable device must calculate a present authentication code, compare it to the original, and they must match.

A programmable device can only be updated if the manufacturer calculates a new authentication code based on a new operation mode code for the new feature set, and the secret key for the specific scrambler, and that new authentication code is loaded into the programmable device's memory.

The invention therefore allows secure control of the feature sets of the programmable devices by creating authentication codes based on secret keys retained in service locations, such as the manufacturer, and that are stored and readable only internally by the programmable device. Therefore, even if a party obtains the operation mode code for all the feature sets of the programmable device, it would not be usable without knowing the secret key for each programmable device and breaking the cryptographic algorithm, which may be possible, but which would take significant time for each programmable device, and therefore be prohibitive.

DETAILED DESCRIPTION OF THE PREFERRED EMBODIMENT

To better understand the invention, one embodiment will now be described in detail. The description will refer to drawings and will utilize reference numerals to indicate various points or locations in the drawings.

The apparatus of the preferred embodiment relates to equipment used in communications, and particularly, to scrambling components used in voice communications via wireless transceivers. Although this description will discuss certain particulars regarding voice scramblers, it is to be understood that the invention is applicable to other programmable devices having other functions, as will be appreciated by those skilled in the art.

FIG. 1 schematically depicts a radio transceiver 10, such as is known in the art. Transceiver 10 can be used to transmit and receive voice communications using radio energy. To obtain privacy of such communications, transceiver 10 includes a scrambler device (schematically indicated at 12) which scrambles or encrypts the speech in a manner that receivers without a complimentary scrambler can not descramble the speech to an understandable form. A wide variety of scramblers and descramblers are known in the art.

Scrambler 12 includes a microprocessor 14 ($\mu$P 14). The $\mu$P 14 can be a Motorola MC68HC805C8 microprocessor set up to be one-time-programmable. Scrambler 12 also utilizes an electrically erasable programmable read-only memory or EEPROM 16, and a secure read-only memory or secure ROM 18. Once programmed, $\mu$P 14 is capable of protecting its ROM from external access.

Scrambler 12 of transceiver 10 is programmable. External access to scrambler 12 is obtained through a conventional side connector programming port 20 on transceiver 10. Port 20 allows transceiver 10 to be connected to a programming device (see FIG. 2) to allow programming and alterations to programming without physical removal of parts or components.

FIG. 1 also schematically indicates some of the information that can be stored in EEPROM 16 and ROM 18. For purposes of this description certain information will be referred to by short hand designations for convenience and will be defined now.

The term "serial number" (or "SN") refers to a unique number that is given to each scrambler made by the manufacturer. This term is thus used in its ordinary sense whereby manufacturers identify each product for purposes of inventory, warranty record keeping.

The term "secret key" (or "SK") here refers to a randomly generated number.

The term "operation mode" (or "OM") refers to a defined set of features (feature set). A scrambler could have one of several feature sets. Each different feature set could contain different level of security, for example. The term generally defines the capabilities of the scrambler or for example, the model of the scrambler.

The term "operation mode code" (or "OMC") refers to a numerical value which is correlated to a particular operation mode or OM.

The term "authentication code" ("AC") refers to a calculated value. A secured encryption algorithm is used with the operation mode code and the secret key to create the authentication code. It is a numerical value that therefore defines an operation mode for a scrambler. It is usually unique to the particular scrambler because it utilizes the secret key for the particular scrambler. It is to be understood, however, that since the secret keys are truly random numbers, there is a possibility that there will be identical secret keys, although this is a low probability if the length of the secret key is sufficiently long.

The term "authorized authentication code" (or "AAC") refers to a value which is calculated by using the SK of the scrambler and the OMC which has been authorized by the factory and has been stored in EEPROM 16. The AAC is always calculated at the factory and is then given to the customer, and represents an encrypted quantification of the feature set or OM which has been authorized by the factory for a particular scrambler either originally, or if the factory has agreed to provide an update to the customer.

The term "present authentication code" (or "PAC") refers to a value which is calculated by using the SK of the scrambler and the present OMC found in the EEPROM. As will be discussed further, the PAC is always calculated by the scrambler each time it is turned on. It uses the same equation or encryption algorithm as the AAC, and seeks to find out if the correct SK is involved (to check for attempts to update an unauthorized scrambler) and/or if the correct OMC is involved (to check for attempts to program into EEPROM 16 an unauthorized OM). This does not have to occur on each "power up" of the scrambler. It could be more frequent or less frequent, but generally is designed to be automatic.

In FIG. 1, EEPROM 16 contains the AAC code as a 32 bit digital word, and the OMC as a four bit word. The OMC is stored twice, thus occupying 8 bits. This is so that the 24 bit SN and the 8 bits of two OMC's occupy a 32 bit word.

Secure ROM 18 contains the SK, here a 64 bit word. It is to be understood that the length of the SK contributes directly to the ultimate security of the system as will be discussed further below. Its length is related to the difficulty (that is, the time and effort) that would be involved in trying to break the encryption algorithm, even with automated programs. As is well known statistically, the number of bits in a number defines the number of possible combinations of numbers. Therefore, the larger the number (e.g. the more bits) the longer it would take to try to arrive at the SK by trial and error. In this embodiment, therefore, higher security would be obtained with a 64 bit SK than a lower amount. Depending on circumstances, however, lower bit lengths can be used. For example, 32 bit lengths are believed to be adequate for many purposes.

Secure ROM 18 is memory, such as is known in the art, that allows one time programming, but thereafter does not allow any reading, except internally by the scrambler. As shown in FIG. 1, secure ROM 18 could also contain the SN, and could also contain code to enable the scrambling function. Generally, secure ROM 18 will be comparatively small in size. In the preferred embodiment it is 256 bits.

FIG. 1 therefore shows that a transceiver 10 can contain a scrambler 12 which has defined in EEPROM 16 the OM or feature set it is entitled to use. Although everything in EEPROM 16 is rather easy to access and read, it is to no avail that a person know the AC or OMC.

If one knows the OMC, one knows the software code for a given feature set. Normally, this might allow other scramblers to be programmed and thus enhanced (assuming the OMC that has been read and programmed into other scrambles is an upgrade to that already installed). However, simply replacing an upgrade OMC in another scrambler will fail to upgrade the scrambler. The scrambler will check if the present OMC and the SK for the scrambler at issue match the AAC, and they will not match because the AAC was based on a non-upgrade OMC.

Furthermore, even if the AAC of a first scrambler is extractable from it, and is replaced for the correct AAC on a second scrambler, it will fail to upgrade the second scrambler. The AAC of the first scrambler is unique to the first scrambler because it utilizes the secure SK of the first scrambler. Therefore, placing a first scrambler's AAC on a second scrambler will not match the correct AAC for the second scrambler.

Moreover, even if both the AAC and higher level OMC of one scrambler are extracted and placed into a second scrambler, it will fail because of the unique, secure SK used to calculate the correct AAC for each scrambler.

Figure 2:
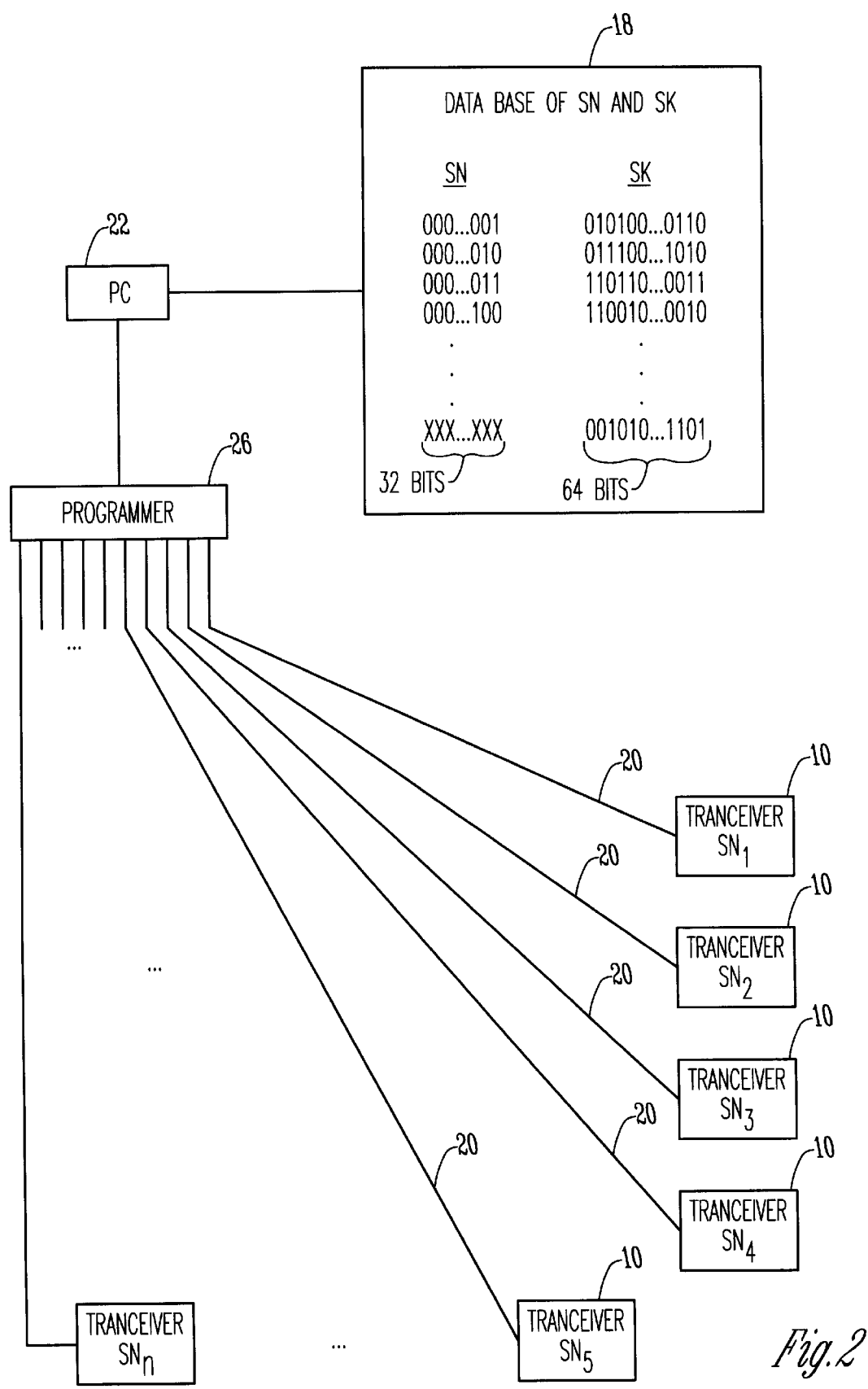
FIG. 2 is a schematic diagram of a system at the manufacturer's location that can be used to change the programming of scramblers such as the scrambler of FIG. 1.

FIG. 2 illustrates schematically a set up to originally program scramblers at the factory. A personal computer or PC 22 operates on a data base 24 which contains a listing of SKs correlated to SNs for scramblers. A programming device or programmer 26, such as is known in the art, operates with PC 22 and can be connected to serial programming ports 20 of scramblers 10. Programmer 26 allows programming of up to 256 bits of secret information into μp 14, along with the executable code which makes the scrambler function. Programmer 26 can be a standard RIB box and PC, FIG. 2 illustrates that one or many scramblers 10 could be programmed.

Data base 24 is preferable secured against access by means known in the art and its contents will not be available or given out. Therefore, the only knowledge of the SKs, as correlated to specific SNs, is held at the factory. The SKs in the secure ROMs of scramblers 10 can not accessed by anyone or anything, except for the scrambler itself.

Operation of the invention will now be described in further detail referring to the schematics of FIGS. 1 and 2, and to the flow diagrams of FIGS. 5, 6, and 7.

Referring first to reference numerals 3–10, 3–12, and 314 of FIG. 5, the manufacturing of scramblers according to the invention begins with the creation of a large data base 24 (see FIG. 2) of 64 bit secret keys SK at the factory; each SK being assigned to a unique 32 bit serial number SN for each scrambler. Each SK is truly random, generated by non-deterministic methodology, such as is known in the art.

The factory determines what capabilities each scrambler will have based on, for example, an order from customers or an internal decision regarding inventory. The factory then creates an operation mode code (OMC) that defines the various levels of capabilities (see 3–16 at FIG. 3). This OMC essentially defines what feature set will be implemented in the scrambler, instructing programming in the scrambler to carry those functions out. An example of the foregoing is as follows. If a manufacturer has three different levels of scrambling security, it could designate each level as a model number for marketing purposes. The OMC could therefore be 2 bits long, having three different values. Further, two of the three models could be configured differently for domestic use and export use. Therefore, two additional options (e.g. security levels) are created and five total options can be coded in three bits. Thus an OMC of three bits could designate the different feature sets for the scrambler.

Figure 3:
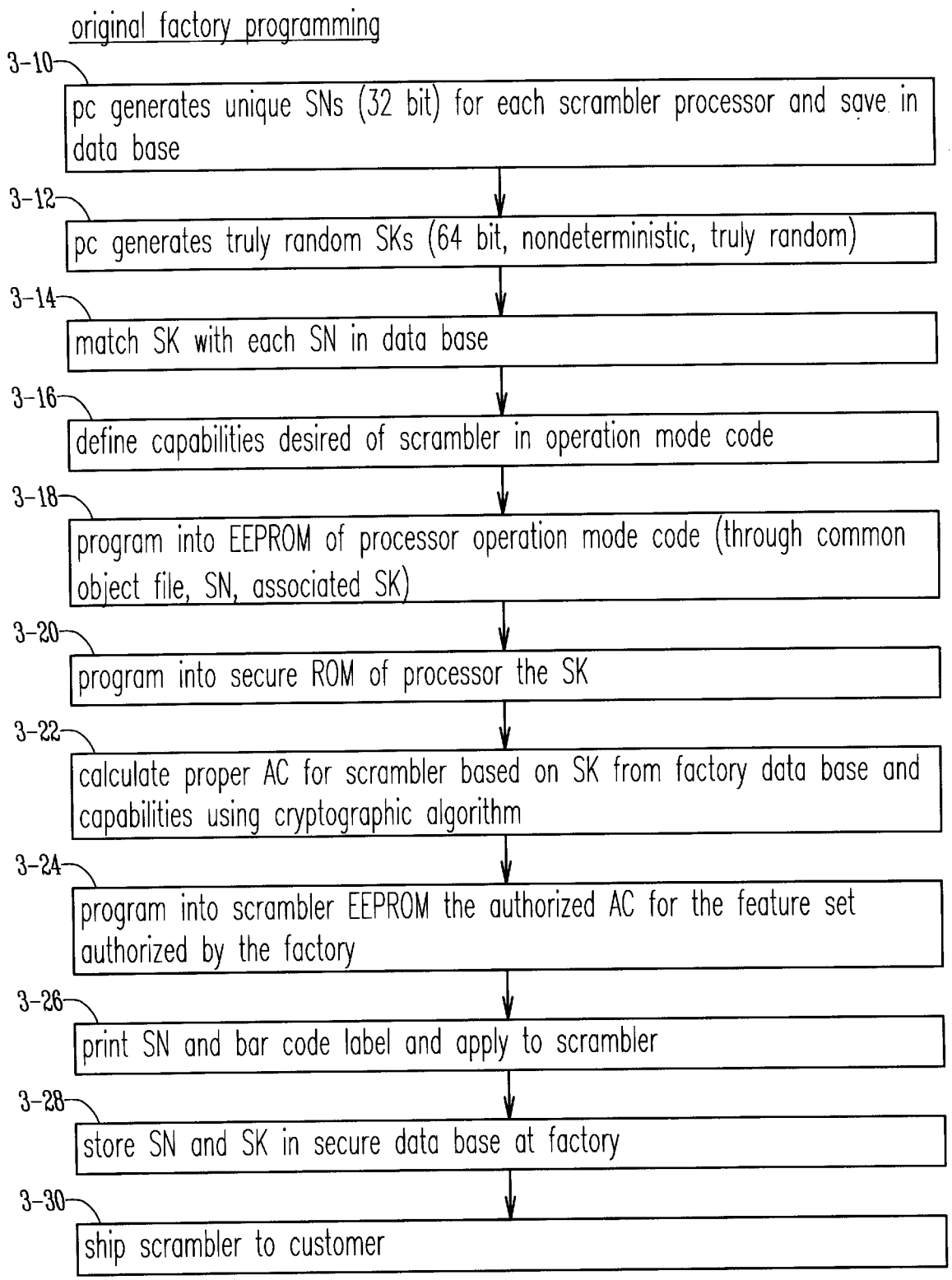
FIG. 3 is a flow chart of operational steps for originally manufacturing and programming the programmable scrambler with a feature set.

By using programmer 26 and PC 22, along with data base 24 of FIG. 2, the OMC and SK for a scrambler 10 are programmed into EEPROM 16 and secure ROM 18 respectively (3–18 and 3–20 of FIG. 3). Additionally, an authorized authentication code AAC is created and programmed into EEPROM 16 (3–22 of FIG. 3).

The AAC is a calculated value determined by the following formula:

$$AAC=E_{SK}(SK+OMC)$$

where AAC equals the calculated authorization code (code calculated by E . . . ); $E_{SK}$ equal an encryption method (encryption by SK of . . . ); SK equals the secret key (64 bits–random number indexed to serial number); and OMC equals a mode type key or operation mode in coded form. The OMC denotes both the level of scrambling and the "exportability" of the product. The permissible values of the OMC will be kept secret, but the security of the system does not depend on this.

The AAC is then programmed into EEPROM 16 (3–24 of FIG. 3). Because security of the system also does not depend on secrecy of the SN, a label bearing the SN and a bar code can be generated at the factory and affixed to the scrambler (3–28 of FIG. 3). The scrambler is then prepared for shipment to the customer or for placement in inventory (3–30 of FIG. 3). It will have a secure SK, an OMC, and an AC which will allow it to operate according to the OMC, as will be discussed below.

Figure 4:
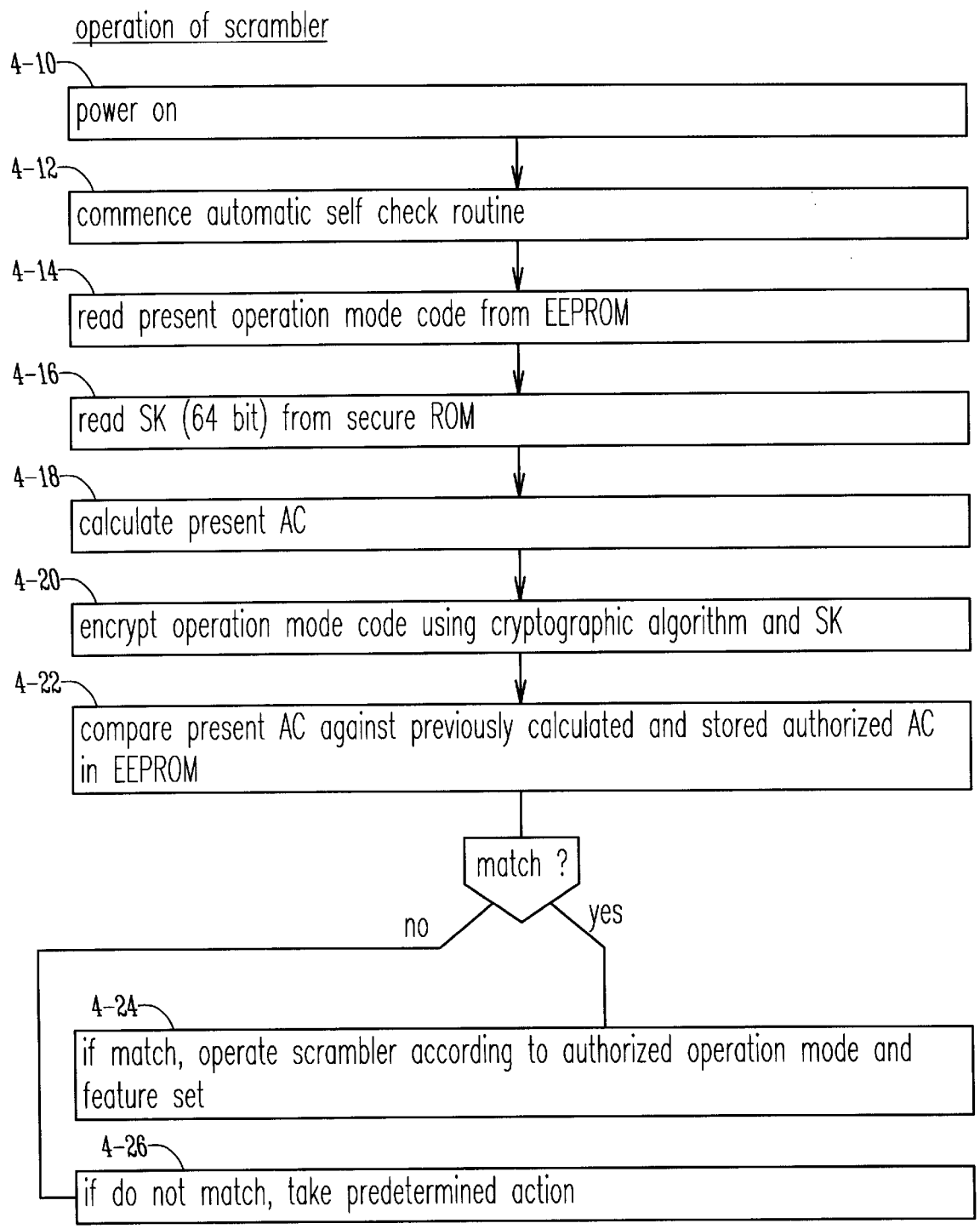
FIG. 4 is a flow chart of operational steps for a scrambler to correctly operate with the authorized feature set.

FIG. 4 illustrates how the scrambler operates. Upon every "power on" (4–10 of FIG. 4) a self check routine is commenced (4–12). This routine reads the value of the SK from secure ROM 18 (4–16) and the present value of the OMC from EEPROM 16 (4–14). The processor 14 of scrambler 12 uses these values to calculate a present AC or PAC using the same calculation that was used at the factory to calculate the original AAC (4–18 and 4–20). The calculation therefore uses the same encryption algorithm used to generate the original AAC (4–20). The only changes would be if there had been some change in the OMC or SK. Since the SK is in secure ROM, any external access is highly unlikely. The SK should be changed for a scrambler. The encryption algorithm is also highly secure and difficult to break. Therefore, the most likely attempt to change the factors of the calculation would be by an attempt to change the OMC.

The scrambler then compares the present AC (just calculated at 4–18) with the original AAC (at 3–22 of FIG. 2) (see 4–22 of FIG. 4). If there is no difference between the present AC(PAC) and the original AC or authorized AC(AAC), the scrambler concludes that it is authorized to operate according to the MC, which then does allow the same (4–24). The present AC(PAC) therefore must have had the correct SK (i.e. it is the right scrambler); the correct encryption algorithm (i.e. it is the right encryption method); and the right OMC (i.e. the feature set and security level code (OMC) that exists in the scrambler matches the feature set and security level that the factory has authorized for that scrambler).

If the present AC(PAC) is different than the original AC(AAC), the scrambler concludes that there is not authorization to function at the present OMC (4–26). It may be that someone has tampered with the OMC to try to give it an update that has not been authorized. It may be that there has been tampering with the SK, although this is highly unlikely. It may be that there has been tampering with the encryption algorithm, again however, highly unlikely.

In any event, the mismatch of present AC(PAC) to original AC(AAC) will cause the scrambler to take action. One option is to refuse to operate at all. Another is to allow voice communication to continue, but without any scrambling. Another is to default to the lowest or original feature set and/or security level for that particular scrambler. Other options are possible.

As previously described, one of the advantages of the present invention is the manner in which a scrambler or number of scramblers can be upgraded with authorization of the factory, while at the same time making it extremely difficult to do so without factory authorization. By referring to FIG. 5, this process can be seen.

First, of course, a decision is made (usually by the customer) to upgrade the capabilities (e.g. scrambler model and/or security level) of a scrambler or collection of scramblers. Once the specific scramblers are identified, a query can be made (by the software) to retrieve the SN of each scrambler (5–10). The factory is then provided a list of the SNs and the upgrades that are desired for those SNs (5–12). As indicated at 5–14, appropriate export licensed, if required, can be obtained by the factory once it knows what feature set and/or security level(s) is/are desired.

The factory then simply uses programmer 26, data base 24, and PC 22 (see FIG. 2) to calculate a new AAC for each scrambler based on the new OMC (5–18). It is noted that this calculation is the same as the original AAC calculation (3–22 of FIG. 3) and the "present AC" or "PAC" calculation (4–18 of FIG. 4), but here the factory uses an authorized new OMC for each scrambler it will upgrade. Therefore, the new AAC will be a different value than the original AAC, but it will also be based on the SK of each particular scrambler.

The new AAC and new OMC are placed in a data file (5–20) that can be contained, for example, on a standard floppy disk, and the data file is then sent to the customer with a core program. This data file will contain the SN(s) of scramblers of the customer that have been approved for update, and the new AAC(s) and OMC(s) for each such scrambler (5–22).

The customer uses a programmer the same as or similar to programmer 26 (with a PC) of FIG. 2, connected to the side programming port 20 of each scrambler to be updated (5–24), and stores in the EEPROM of the scrambler the new OMC and new EC.

Each of the scramblers authorized by the factory for update, and which have been updated, will now operate at the updated feature set according the operation procedure of FIG. 4 (5–26). If desired, the factory could revise its data base and keep track of the current status of OMCs for each serial number (5–28).

The included preferred embodiment is given by way of example only and not by way of limitation to the invention, which is solely described by the claims herein. Variations obvious to one skilled in the art will be included within the invention defined by the claims.

What is claimed:

1. A method for controlling the feature set of a programmable device comprising:

identifying a programmable device by a unique number;

generating a secret key for each programmable device, the secret key being stored in and readable by the programmable device but being secure from external reading;

creating a database of secret keys correlated to unique numbers at a first location;

calculating an authentication code based on the secret key of the programmable device and an authorized feature set for the programmable device using a secure cryptographic algorithm;

storing the authentication code in a non-secure place in the programmable device;

storing instructions related to executing a feature set in the programmable device;

and thereafter, each time the programmable device is powered on, comparing the stored authentication code with a present calculated authentication code, using the same calculation, and if the stored authentication code and the present calculated authentication code match, allowing the programmable device to function according the authorized feature set.

2. The method of claim 1 wherein the secret key is a numerical value.

3. The method of claim 2 wherein the secret key is a randomly generated number.

4. The method of claim 3 wherein the randomly generated number is at least 32 bits long.

5. The method of claim 4 wherein the randomly generated number is 64 bits long.

6. The method of claim 1 wherein the authorized feature set is encoded in an operation mode code, each different feature set having a different numerical value.

7. The method of claim 1 wherein the programmable device is a voice scrambler.

8. The method of claim 7 wherein the voice scrambler includes a microprocessor, an EEPROM, and a secure ROM, the secret key being stored in the secure ROM.

9. The method of claim 7 wherein the scrambler is operatively positioned within a radio transceiver.

10. The method of claim 1 further comprising changing the authorized feature set by calculating new authentication codes for each scrambler to be changed based of the secret key for each such scrambler and new feature set information, while using the same cryptographic algorithm.

11. The method of claim 1 further comprising if the present authentication code does not match the authentication code, the programmable device does not function according to the authorized feature set of the present authentication code.

12. The method of claim 1 further comprising if the present authentication code does not match the authentication code, the programmable device does not function.

13. The method of claim 1 further comprising if the present authentication code does not match the authentication code, the programmable device defaults to no more than an originally authorized feature set.

14. The method of claim 1 wherein during any upgrade procedure of the feature set of the programmable device, the upgrade procedure includes intentional time delays so that any attempt to randomly match an upgraded authentication code for any particular programmable device, will not only be useful only for that particular programmable device, but will take a substantial amount of time, controlled by the length of the secret key.

15. An apparatus for controlling the feature set of a programmable device, comprising:

a programmable device including a microprocessor, an EEPROM, a secure ROM, and a programming port;

a programming device including a computer having a data base and a programming port;

software in the computer which generates a table of randomly generated numbers called secret keys which are correlated to a set of unique serial numbers that is stored in the database;

software in the programming device and in the programmable device which includes a secure cryptographic algorithm and which generates an authentication code based on the secret key of a programmable device and an operation mode code from which the programmable device operates a certain feature set;

so that each programmable device is correlated to a unique serial number, the secret key correlated to each programmable device is stored in the secure ROM, an authorization code is stored the EEPROM; and each time the programmable device is turned on, a present authentication code is calculated and compared to the authentication code to verify that no tampering with the authorized feature set instruction has occurred.

16. The apparatus of claim 15 wherein the programmable device is a voice scrambler.

17. The apparatus of claim 16 wherein the voice scrambler encrypts speech according to an encryption algorithm.

18. The method of claim 15 wherein the secret key is a numerical value based on non-deterministic methodology.

19. The method of claim 18 wherein the secret key is a digital word at least 32 bits long.

20. The method of claim 19 wherein the randomly generated number is 64 bits long.

21. The method of claim 15 wherein the authorized feature set is encoded in an operation mode code, each different feature set having a different numerical value.

22. A method of controlling the feature set of plurality of programmable devices each of which uses a feature set code in a non-secure memory to instruct the programmable device which feature set is available for use, comprising:

assigning a unique identification number to each programmable device;

assigning a randomly generated number to each identification number;

assigning a unique feature set code to each feature set option for the programmable device;

storing the each set of identification number and randomly generated number into a secure database held at a secure, location;

storing the randomly generated number in a secure ROM of the programmable device;

storing an authorized feature set code into a non-secure memory of the programmable device;

calculating an authentication code based on the following formula $$AC = ESK(SK+OMC)$$

where $E_{SK}$ equals an encryption method; SK equals the randomly generated number; and OMC equals the feature set code; and the + sign indicates defined relationship between SK and OMC, so that the authentication code is dependent upon the secure SK, which is correlated to a unique identification number;

storing the authentication code in non-secure memory in the programmable device;

periodically recalculating and comparing the authentication code to the stored authentication code;

allowing the programmable device to function according to the stored feature set code if the recalculated and the stored authentication codes are the same.

* * * * *

UNITED STATES PATENT AND TRADEMARK OFFICE
CERTIFICATE OF CORRECTION

PATENT NO. : 5,771,287
DATED : Jun. 23, 1998
INVENTOR(S) : Gilley, et al.

It is certified that error appears in the above-identified patent and that said Letters Patent is hereby corrected as shown below:

In claim 22, column 12, line 12, please delete $AC=ESK(SK+OMC)$ and substitute -- $AC=E_{SK}(SK+OMC)$ --.

Signed and Sealed this

Third Day of November, 1998

Attest:

BRUCE LEHMAN

Attesting Officer

Commissioner of Patents and Trademarks